US 8,605,583 B2

(12) United States Patent
Cutler et al.

(10) Patent No.: US 8,605,583 B2
(45) Date of Patent: Dec. 10, 2013

(54) PCC/QOS RULE CREATION

(75) Inventors: Kevin Scott Cutler, Carp (CA); Fernando Cuervo, Ottawa (CA); Mike Vihtari, Kanata (CA); Ajay Kirit Pandya, Ottawa (CA)

(73) Assignee: Alcatel Lucent, Paris (FR)

( * ) Notice: Subject to any disclaimer, the term of this patent is extended or adjusted under 35 U.S.C. 154(b) by 782 days.

(21) Appl. No.: 12/708,209

(22) Filed: Feb. 18, 2010

(65) Prior Publication Data
US 2011/0202485 A1 Aug. 18, 2011

(51) Int. Cl.
*H04L 12/14* (2006.01)
(52) U.S. Cl.
CPC ........................... *H04L 12/14* (2013.01)
USPC ........................... 370/230; 709/223
(58) Field of Classification Search
CPC .................. H04L 12/14; H04L 12/1407
USPC .......................... 370/230; 709/223
See application file for complete search history.

(56) References Cited

U.S. PATENT DOCUMENTS

| 2009/0228956 A1* | 9/2009 | He et al. .......................... 726/1 |
| 2010/0180319 A1* | 7/2010 | Hu et al. ........................... 726/1 |
| 2011/0138066 A1* | 6/2011 | Kopplin et al. .................. 709/228 |
| 2011/0208853 A1* | 8/2011 | Castro-Castro et al. ........ 709/223 |
| 2011/0317558 A1* | 12/2011 | Siddam et al. ................. 370/235 |
| 2012/0005356 A1* | 1/2012 | Hellgren ........................ 709/229 |
| 2012/0023246 A1* | 1/2012 | Castro Castro et al. ........ 709/229 |
| 2012/0064878 A1* | 3/2012 | Castro Castro et al. ........ 455/418 |

FOREIGN PATENT DOCUMENTS

WO 2009039750 A1 4/2009

OTHER PUBLICATIONS

ETSI technical specification 129 213 version 8.6.0, 3GPP TS 29.213 release 8 (Jan. 2010).*
ETSI technical specification 123 203 version 9.2.0, 3GPP TS 23.203 Release 9 (Oct. 2009).*
Albaladejo, A., et al., The PCC Rule in the 3GPP IMS Policy and Chargin Control Architecture, IEEE Globecom 2008, pp. 1-5.*
3GPP TS 29.212 "3rd Generation Partnership Project; Technical Specification Group Core Network and Terminals; Policy and Charging Control Over Gx Reference Point (Release 9)", No. V9.1.0, 2009, pp. 1-106.
3GPP TS 29.213 "3rd Generation Partnership Project; Technical Specification Group Core Network and Terminals; Policy and Charging Control Signalling Flows and QoS Parameter Mapping (Release 8)", No. V8.6.0, 2009, pp. 1-122.
3GPP TS 29.214 "3rd Generation Partnership Project; Technical Specification Group Core Network and Terminals; Policy and Charging Control Over Rx Reference Point (Release 9)", No. V9.2.0, 2009, pp. 1-44.

(Continued)

*Primary Examiner* — Kibrom T Hailu
*Assistant Examiner* — Benjamin Lamont
(74) *Attorney, Agent, or Firm* — Kramer & Amado, P.C.

(57) ABSTRACT

Various exemplary embodiments relate to a method and related network node and machine-readable storage medium including one or more of the following: receiving, at the PCRN, the application request message; determining at least one requested service flow from the application request message; for each requested service flow of the at least one requested service flow, generating a new PCC rule based on the application request message; and providing each new PCC rule to a Policy and Charging Enforcement Node (PCEN). Various exemplary embodiments further include an application request message including at least one media component and at least one media subcomponent and the step of for each media subcomponent, determining a requested service flow from the media subcomponent.

32 Claims, 5 Drawing Sheets

(56) References Cited

OTHER PUBLICATIONS

International Search Report for corresponding PCT/IB2011/000634 dated Oct. 11, 2011.

ETSI TS 129 212, "Universal Mobile Telecommunications System (UMTS); LTE; Policy and Charging Control Over Gx Reference Point (3GPP TS 29.212 version 9.2.0 Release 9)", 2010.

ETSI TS 129 213, "Digital Cellular Telecommunications System (Phase 2+); Universal Mobile Telecommunications System (UMTS); LTE; Policy and Charging Control Signalling Flows and Quality of Service (QoS) Parameter Mapping (3GPP TS 29.213 version 9.2.0 Release 9)", 2010.

ETSI TS 129 214, "Universal Mobile Telecommunications System (UMTS); LTE Policy and Charging Control Over Rx Reference Point (3GPP TS 29.214 version 9.3.0 Release 9)", 2010.

* cited by examiner

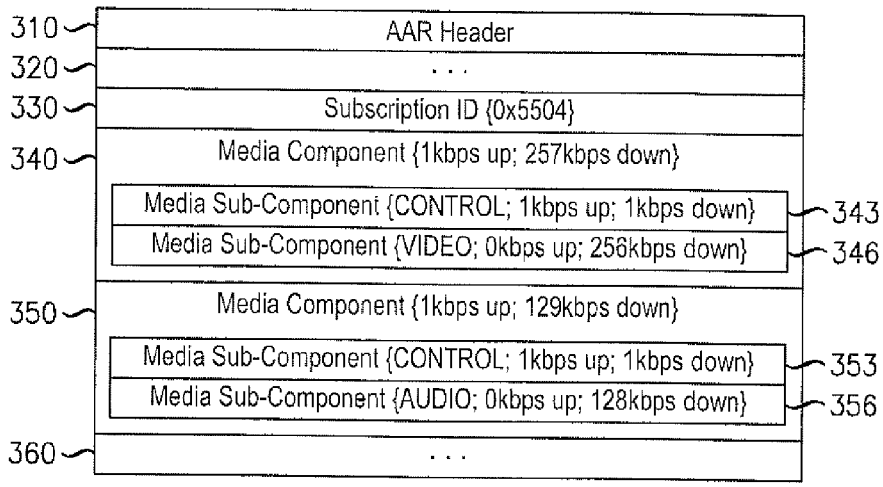
FIG. 3
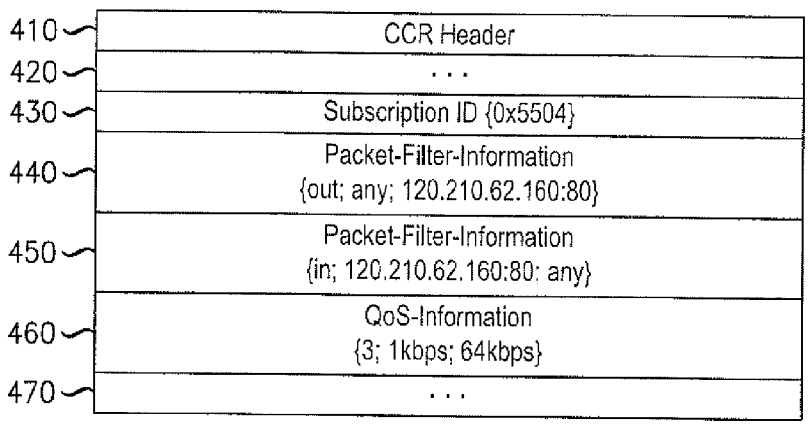
FIG. 4
| | 505 | 510 | 515 | 520 | 525 |
|---|---|---|---|---|---|
| | Rule Name | Service Data Flow Filter | Flow Status | QoS Parameters | Charging Parameters |
| 530 | 0xE426 | 0x90F2CE32... | {Open; Open} | {8; 2kbps;8kbps} | {0.05/kb} |
| 535 | 0x99B2 | 0xB2B56FE1... | {Open; Open} | {6; 16kbps;16kbps} | {0.10/min} |
| 540 | ... | ... | ... | ... | ... |
FIG. 5

| | Subscription ID | Bandwidth Limits | Charging Parameters |
|---|---|---|---|
| 620 | 0x3F53 | {2kbps;512kbps} | {0.02/kb;0.05/min} |
| 625 | 0x5504 | {2kbps;1024kbps} | {0.01/kb;0.05/min} |
| 630 | ... | ... | ... |

*FIG. 6*

| | Media Type | QCI |
|---|---|---|
| 715 | AUDIO | 6 |
| 720 | VIDEO | 7 |
| 725 | DATA | 5 |
| 730 | APPLICATION | 8 |
| 735 | CONTROL | 2 |
| 740 | TEXT | 2 |
| 745 | MESSAGE | 4 |
| 750 | OTHER | 1 |

*FIG. 7*

PCC/QOS RULE CREATION

TECHNICAL FIELD

Various exemplary embodiments disclosed herein relate generally to policy and charging in telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks, leading to a less-than-elegant solution. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order to provide reliable data services and charge subscribers for use thereof.

For example, 3GPP TS 29.212 and 3GPP TS 29.214 provide some guidance on the establishment of an application session by the EPC upon receipt of an application request from an application function (AF) in the form of an AA-Request (AAR) message or from a packet data network gateway (PGW) in the form of a Credit Control Request (CCR) message. The standards specify that the PCRF is responsible for receiving new application requests, creating new policy and charging control (PCC) rules commensurate with such requests, and providing these new PCC rules to the PCEF for installation. The 3GPP standards also define the format of application request messages and PCC rules.

The 3GPP standards do not, however, describe how the PCRF should interpret an application request or create PCC rules. Such functionality is crucial to the operation of the EPC. Without a means to create appropriate PCC rules based on an application request, the EPC may not be able to establish application sessions, charge subscribers for application usage, or ensure that a certain QoE level is met in providing services.

In view of the foregoing, it would be desirable to provide a method for dynamically creating new PCC rules in fulfillment of application requests. In particular, it would be desirable to provide a PCRF that may flexibly respond to AF and PGW application requests by creating new PCC rules that achieve the objects of the received requests.

SUMMARY

In light of the present need for a method for dynamically creating new PCC rules in fulfillment of application requests, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a policy and charging rules node (PCRN) for processing an application request message to generate at least one policy and charging control (PCC) rule, the method comprising: receiving, at the PCRN, the application request message; determining at least one requested service flow from the application request message; for each requested service flow of the at least one requested service flow, generating a new PCC rule based on the application request message; and providing each new PCC rule to a Policy and Charging Enforcement Node (PCEN).

It should be apparent that, in this manner, various exemplary embodiments enable dynamic creation of policy and charging control rules in response to an application request. Particularly, by translating an application request message into a number of requested service flows, a policy and charging rules node may generate a rule to provide each requested service flow that is dynamically based on the requested application, subscriber data, and/or rule-based policy decisions.

BRIEF DESCRIPTION OF THE DRAWINGS

In order to better understand various exemplary embodiments, reference is made to the accompanying drawings, wherein:

FIG. 3 illustrates an exemplary network-originated application request message;

FIG. 4 illustrates an exemplary user equipment-originated application request message;

FIG. 5 illustrates an exemplary data arrangement for storing PCC rules;

FIG. 6 illustrates an exemplary data arrangement for storing subscription profile data;

FIG. 7 illustrates an exemplary data arrangement for storing correlations between media types and quality of service (QoS) class identifiers (QCIs)

DETAILED DESCRIPTION

Figure 1:
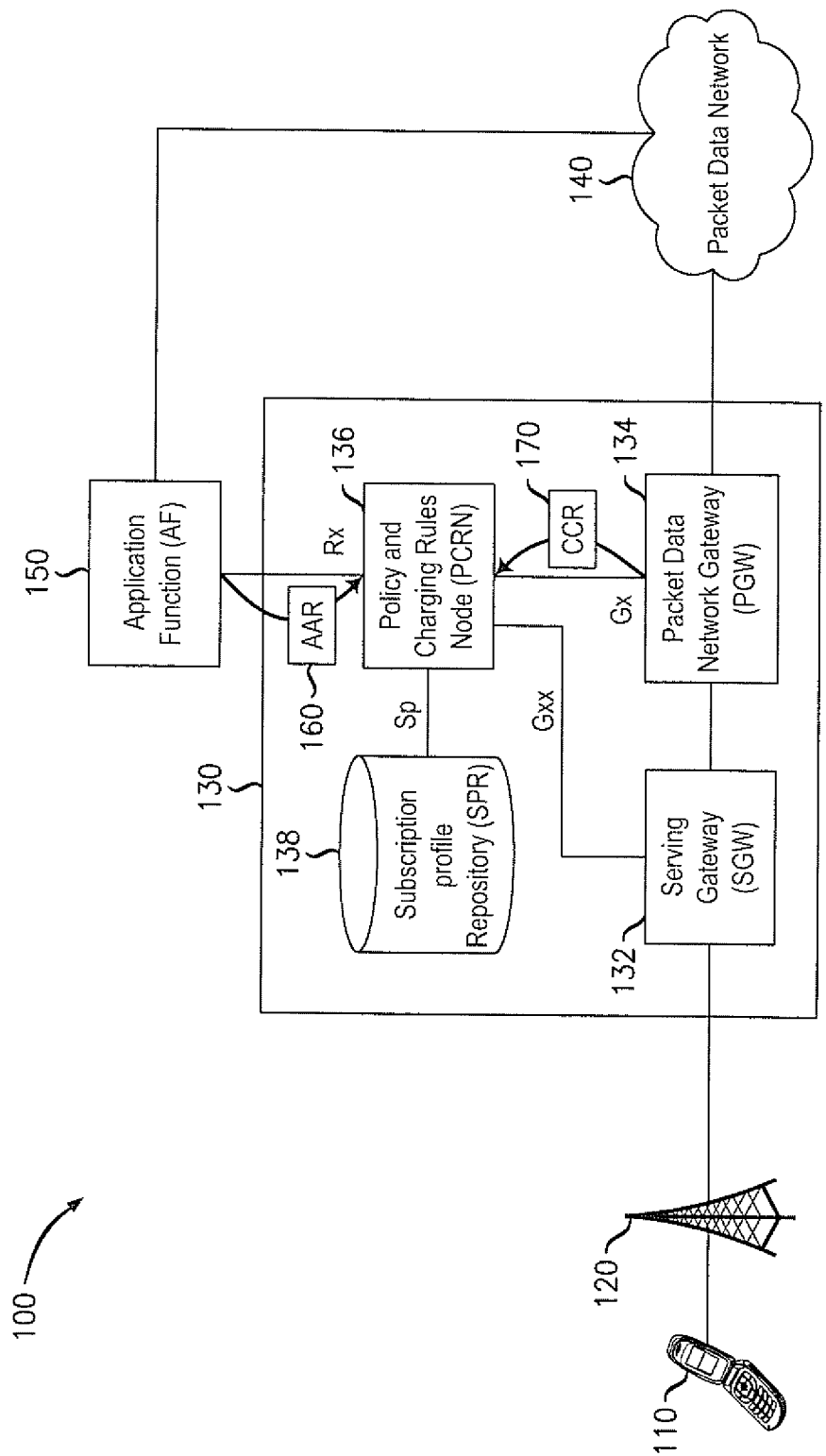
FIG. 1 illustrates an exemplary subscriber network for providing various data services.

Referring now to the drawings, in which like numerals refer to like components or steps, there are disclosed broad aspects of various exemplary embodiments.

FIG. 1 illustrates an exemplary subscriber network 100 for providing various data services. Exemplary subscriber network 100 may be telecommunications network or other network for providing access to various services. Exemplary subscriber network 100 may include user equipment 110, base station 120, evolved packet core (EPC) 130, packet data network 140, and application function (AF) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130. SGW 132 may be the first device within the EPC 130 that receives packets sent by user equipment 110. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services. As will be described in further detail below with respect to FIG. 4, upon receiving a request for an unknown application service from UE 110, PGW may construct a credit control request (CCR), such as CCR 170, requesting an appropriate allocation of resources and forward the request to PCRN 136.

Policy and charging rules node (PCRN) 136 may be a device that receives requests for application services, generates PCC rules, and provides PCC rules to the PGW 134 and/or other PCENs (not shown). PCRN 136 may be in communication with AF 150 via an Rx interface. As described in further detail below with respect to AF 150 and FIG. 3, PCRN 136 may receive an application request in the form of an AA-Request (AAR) 160 from AF 150. Upon receipt of AAR 160, PCRN 136 may generate at least one new PCC rule for fulfilling the application request 160.

PCRN 136 may also be in communication with SGW 132 and PGW 134 via a Gxx and a Gx interface, respectively. As described in further detail below with respect to FIG. 4, PCRN 136 may receive an application request in the form of a credit control request (CCR) 170 from SGW 132 or PGW 134. As with AAR 160, upon receipt of CCR 170, PCRN may generate at least one new PCC rule for fulfilling the application request 170. In various embodiments, AAR 160 and CCR 170 may represent two independent application requests to be processed separately, while in other embodiments, AAR 160 and CCR 170 may carry information regarding a single application request and PCRN 136 may create at least one PCC rule based on the combination of AAR 160 and CCR 170. In various embodiments, PCRN 136 may be capable of handling both single-message and paired-message application requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. As will be described in further detail with reference to FIG. 5, data stored by SPR 138 may include an identifier of each subscriber and indications of subscription information for each subscriber such as bandwidth limits, charging parameters, and subscriber priority.

Packet data network 140 may be any network for providing data communications between user equipment 110 and other devices connected to packet data network 140, such as AF 150. Packet data network 140 may further provide, for example, phone and/or Internet service to various user devices in communication with packet data network 140.

Application function (AF) 150 may be a device that provides a known application service to user equipment 110. Thus, AF 150 may be a server or other device that provides, for example, a video streaming or voice communication service to user equipment 110. AF 150 may further be in communication with the PCRN 136 of the EPC 130 via an Rx interface. When AF 150 is to begin providing known application service to user equipment 110, AF 150 may generate an application request message, such as an AA-Request (AAR) 160 according to the Diameter protocol, to notify the PCRN 136 that resources should be allocated for the application service. This application request message may include information such as an identification of the subscriber using the application service and an identification of the particular service data flows that must be established in order to provide the requested service. AF 150 may communicate such an application request to the PCRN 136 via the Rx interface.

Having described the components of subscriber network 100, a brief summary of the operation of subscriber network 100 will be provided. It should be apparent that the following description is intended to provide an overview of the operation of subscriber network 100 and is therefore a simplification in some respects. The detailed operation of subscriber network 100 will be described in further detail below in connection with FIGS. 2-7.

According to various exemplary embodiments, user equipment 110 may communicate with AF 150 to indicate that user equipment 110 wishes to receive a known service provided by AF 150. Such communication may occur via EPC 130 and packet data network 140 or via other communications channels (not shown). AF 150 may then construct an AAR 160 indicating the subscriber and the data flows necessary to provide the requested service. AF 150 may then forward the AAR 160 to the PCRN 136 via the Rx interface. Upon receipt of the AAR 160, PCRN 136 may generate a PCC rule for each flow indicated by the AAR 160 as necessary to providing the requested service. When generating each PCC rule, PCRN 136 may also take other information into account, such as subscriber data from SPR 138 and internally generated policy decisions. PCRN 136 may then transmit each new PCC rule to PGW 134 via the Gx interface for installation. After installation of the new PCC rules, PGW 134 may then allow data communication for each of the requested data flows while appropriately charging the subscriber and ensuring that a particular QoS is met.

In various embodiments, such as those including a PMIP deployment, SGW 132 may be at least partially responsible for ensuring that the necessary QoS is met. In such cases, PCRN 136 may also generate a matching QoS rule for each new PCC rule. PCRN 136 may then provide each new QoS rule to SDW 132 via the Gxx interface for installation.

It should be noted that, while the above example describes a network-initiated application request in the form of an AAR 160, the methods and devices described herein are also capable of responding to a UE-initiated application request in the form of a CCR 170.

Figure 2:
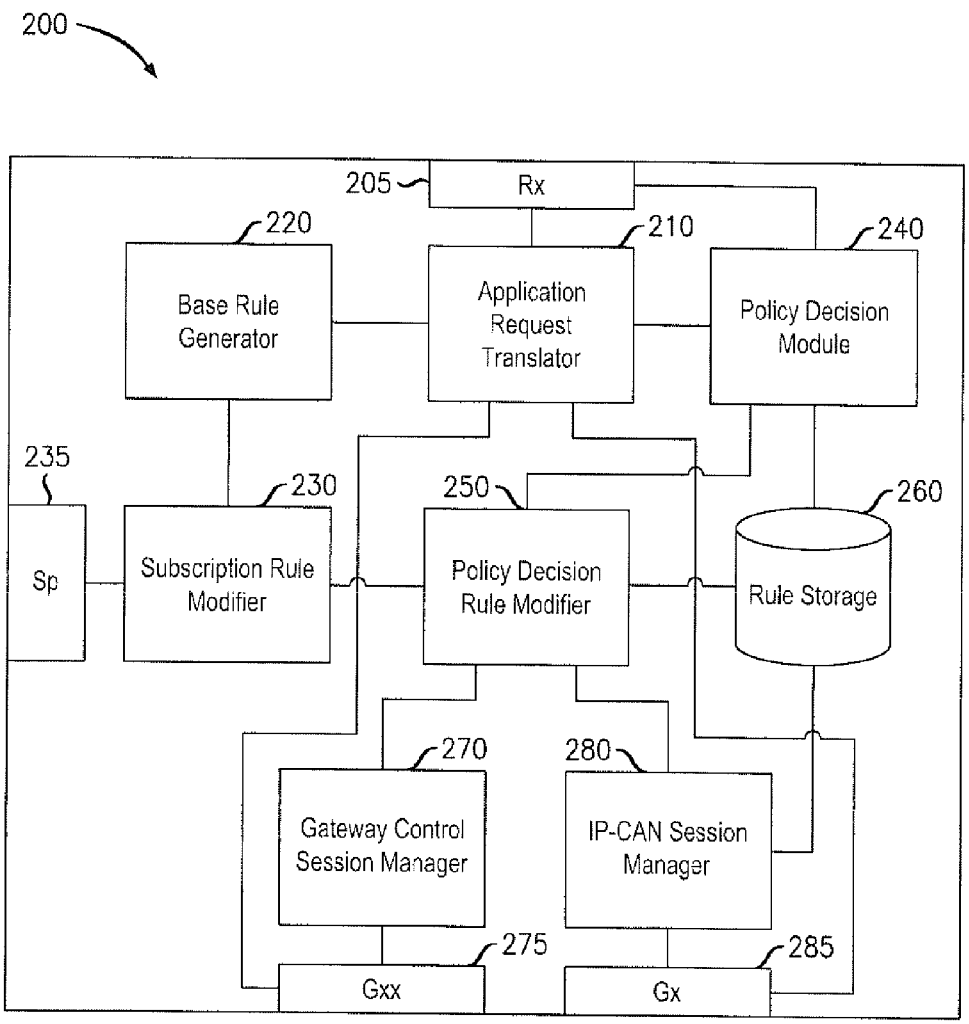
FIG. 2 illustrates an exemplary policy and charging rules node (PCRN) for creating new policy and charging control (PCC) rules in response to application requests.

FIG. 2 illustrates an exemplary policy and charging rules node (PCRN) 200 for creating new policy and charging control (PCC) rules in response to application requests. PCRN 200 may correspond to PCRN 136 of exemplary subscriber network 100. PCRN 200 may include an Rx interface 205, application request translator 210, base rule generator 220, subscription rule modifier 230, Sp interface 235, policy decision module 240, policy decision rule modifier 250, rule storage 260, gateway control session manager 270, Gxx interface 275, IP-CAN session manager 280, and Gx interface 285.

Rx interface 205 may be an interface comprising hardware and/or executable instructions encoded on a machine-readable storage medium configured to communicate with an AF such as AF 150. Such communication may be implemented according to the 3GPP TS 29.214. Specifically, Rx interface 205 may receive an application request (AAR) from AF 150.

Application request translator 210 may include hardware and/or executable instructions on a machine-readable storage medium configured to determine from an application request, whether it be an AAR, CCR, or combination thereof, what service data flows will be necessary to provide a requested service. As will be described in greater detail below with respect to FIGS. 3-4, an application request may identify a number of streams needed to provide the requested service. Application request translator 210 may then generate a service flow object to represent each requested data stream. Each service flow object may include information described by the application request such as, for example, requested bandwidth, packet filter, subscriber identifier, and/or data stream type. Application request translator 210 may then pass each service flow object to base rule generator 230 for further processing.

Base rule generator 220 may include hardware and/or executable instructions on a machine-readable storage medium configured to generate a new PCC rule based on a received application request and/or a service flow object generated by the application request translator 210. Base rule generator may first generate a new PCC rule object. Next, base rule generator 220 may generate a name for the new PCC rule and store it in the PCC rule object. The PCC rule name may be generated according to any method known to those of skill in the art such as, for example, incrementing a previously assigned rule name or generating a random name. Base rule generator 220 may also insert other data into the PCC rule object, including information ascertained from the AAR, CCR, and/or service flow object such as, for example, bandwidth, flow status, and/or flow descriptors. At this point, the new PCC rule may be a valid rule ready for installation or may require further modification before it will function properly upon installation. Base rule generator may then pass the PCC rule object to subscription rule modifier 230 for further processing.

Subscription rule modifier 230 may include hardware and/or executable instructions on a machine-readable storage medium configured to modify a PCC rule object based on subscription information. Subscription rule modifier 230 may first receive a PCC rule object, service flow object, CCR, and/or AAR and determine a subscription ID associated with the request. Subscription rule modifier 230 may then retrieve a subscription profile record from an SPR via Sp interface 235. The accessed SPR may correspond to SPR 138 and may be an external node or a component of PCRN 200. Using this subscription profile record, subscription rule modifier 230 may modify the PCC rule object according to subscriber-specific data. For example, subscription rule modifier 230 may modify the bandwidth of the PCC rule object according to maximum allowed bandwidths stated in the subscription profile record. As another example, subscriber rule modifier 230 may set charging parameters in the PCC rule object according to the information stored in the subscription profile record to indicate how much money the subscriber is to be charged for each metered activity unit for the service. Other subscription-specific modifications to the new PCC rule object will be apparent to those of skill in the art. After all modifications to the PCC rule object are complete, subscription rule modifier 230 may pass the PCC rule object on to the policy decision rule modifier 250.

Sp interface 235 may be an interface comprising hardware and/or executable instructions encoded on a machine-readable storage medium configured to communicate with a SPR such as SPR 138. Thus, Sp interface 235 may transmit record requests and receive subscription profile records.

Policy decision module 240 may include hardware and/or executable instructions on a machine-readable storage medium configured to perform a policy decision regarding an application request received via the Rx interface 205, Gxx interface 275, and/or Gx interface 285. Such policy decision may occur concurrently with the operation of application request translator 210. Policy decision module 240 may utilize policy decision rules stored in rules storage 260 or elsewhere (not shown) to generate a policy decision for the application request. In generating a policy decision, policy decision module 240 may also take into account subscriber data retrieved from an SPR such as SPR 138 and/or data related to an existing application session. A policy decision result may include information such as values for charging parameters, QoS parameters, service identifiers, rating groups, online or offline charging method, metering method, reporting level, and/or allocation retention priority. Policy decision module 240 may then forward these policy decision results to policy decision modifier 250.

Policy decision rule modifier 250 may include hardware and/or executable instructions on a machine-readable storage medium configured to modify a PCC rule object based on policy decision results generated by policy decision module 240. For example, policy decision rule modifier 250 may insert information such as charging parameters, QoS parameters, service identifiers, rating groups, online or offline charging method, metering method, reporting level, and/or allocation retention priority into the PCC rule object. Policy decision rule modifier 250 may further determine a QoS Class Identifier (QCI) for the PCC rule. This may be accomplished according to any manner known to those of skill in the art such as, for example, referring to a mapping table that correlates a media type specified by the AAR to a QCI. From the QCI and bandwidths provided in the application request, policy decision rule modifier 250 may determine additional and/or alternative QoS parameters to be inserted into the PCC rule object. Policy decision rule modifier 250 may then store the PCC rule object as a new PCC rule in rule storage 260 and forward the new PCC rule to IP-CAN session manager 280 for installation. In various embodiments utilizing gateway control sessions to provide QoS assurance, such as an embodiment utilizing PMIP, policy decision rule modifier 250 may also forward the new PCC rule to gateway control session manager 270.

Rule storage 260 may be any machine-readable medium capable of storing PCC rules generated by the PCRN 200. Accordingly, rule storage 260 may include a machine-readable storage medium such as read-only memory (ROM), random-access memory (RAM), magnetic disk storage media, optical storage media, flash-memory devices, and/or similar storage media. As will be described in further detail below with respect to FIG. 5, rule storage 260 may store definitions of numerous PCC rules created by PCRN 200. Such definitions may include, for example, rule names, service data flow filters, QoS parameters, and charging parameters.

Gateway control session manager 270 may include hardware and/or executable instructions on a machine-readable storage medium configured to generate and transmit QoS rules for installation at an SGW or other node implementing a gateway control session. In various embodiments utilizing gateway control sessions to provide QoS assurance, such as an embodiment utilizing PMIP, gateway control session manager 270 may extract information necessary to generate a QoS rule from a PCC rule. For example, gateway control session manager 270 may extract the rule name, service data flow filter, and QoS parameters from a PCC rule and generate a new QoS rule. Gateway control session manager 270 may then forward the new QoS rule to an SGW or other appropriate node via Gxx interface 275.

Gxx interface 275 may be an interface comprising hardware and/or executable instructions encoded on a machine-readable storage medium configured to communicate with a SGW such as SGW 132. Such communication may be implemented according to the 3GPP TS 29.212. Thus, Gxx interface 275 may receive requests for QoS rules and transmit QoS rules for installation. Gxx interface 275 may further receive UE-originated application requests in the form of a CCR.

IP-CAN session manager 280 may include hardware and/or executable instructions on a machine-readable storage medium configured to transmit a new PCC rule to a PGW or other node implementing a PCEF. IP-CAN session manager 280 may receive a new PCC rule and immediately forward it to a PGW or other node via Gx interface 285. IP-CAN session manager 280 may perform additional functionality such as, for example, receiving requests for rules via Gx interface 285 and responding by retrieving the requested rule from rule storage 260 and transmitting it via the Gx interface 285.

Gx interface 285 may be an interface comprising hardware and/or executable instructions encoded on a machine-readable storage medium configured to communicate with a PGW such as PGW 134. Such communication may be implemented according to the 3GPP TS 29.212. Thus, Gx interface 285 may receive requests for PCC rules and transmit PCC rules for installation. Gx interface 285 may further receive UE-originated application requests in the form of a CCR, such as CCR 170.

FIG. 3 illustrates an exemplary network-originated application request message in the form of an AAR 300. AAR 300 may be constructed according to the Diameter message protocol and/or 3GPP TS 29.214. Accordingly, AAR 300 may include a header 310, subscription ID field 330, media component fields 340, 350, and a number of additional fields 320, 360. Note that the order of the fields of AAR 300 may vary. Thus, for example, subscription ID field 330 may be located after media component fields 340, 350.

Header 310 may be a standard Diameter header indicating that message 300 is an AAR. Thus, header 310 may include a command code field set to a value of 265 and the R-bit field of the command flags field set, as provided for by the Diameter protocol and 3GPP TS 29.214.

Subscription ID field 330 may be an attribute-value pair (AVP) for indicating a subscription that is associated with the particular request. For example, subscription ID field 330 indicates that the subscription identified by the value "0x5504" is associated with AAR 300. This information may be used to access a subscription profile record and charge the appropriate subscriber in relation to the requested service.

Media component fields 340, 350 may contain service information related to each media component of a requested service. In the example of AAR 300, the request may be for a streaming video. Media component 340 may correspond to the video portion of the stream while media component 350 may correspond to the audio portion of the stream. Each media component may carry further description such as, for example, the requested bandwidth for each portion of the stream. Thus, media component 340 may request 1 kbps upstream and 257 kbps downstream for the video portion while media component 350 may request 1 kbps upstream and 129 kbps downstream for the audio portion.

Media component fields 340, 350 may further include media sub-components 343, 346, 353, 356, each indicating an independent data stream necessary for providing the requested service. Thus, media sub-component 343 may indicate that a control stream having bandwidth of 1 kbps upstream and 1 kbps downstream is necessary for providing a streaming video. Likewise, media sub-component 346 may indicate that a video stream having 256 kbps downstream bandwidth is also necessary for a streaming video. Media-subcomponents 353, 356 may similarly indicate that a control stream having 1 kbps bandwidth in both directions and an audio stream having 128 kbps downstream are necessary for providing the audio component of the streaming video.

Additional fields 320, 360 may include additional information as specified by the Diameter protocol and/or 3GPP TS 29.214. Thus, additional fields 320, 360 may include additional attribute value pairs (AVPs) such as the Origin-Host AVP, Destination-Host AVP, Supported-Features AVP, Framed-IP-Address AVP, etc. Additional fields 320, 260 may be used in extracting other useful information such as, for example, flow identifying information.

FIG. 4 illustrates an exemplary user equipment-originated application request message in the form of a CCR 400. CCR 400 may be constructed according to the Diameter message protocol and/or 3GPP TS 29.212. Accordingly, CCR 400 may include a header 410, subscription ID field 430, packet filter information fields 440, 450, QoS information field 460, and a number of additional fields 420, 470. Note that the order of the fields of CCR 400 may vary. Thus, for example, subscription ID field 430 may be located after packet filter information fields 440, 450, or QoS information field 460.

Header 410 may be a standard Diameter header indicating that message 400 is a CCR. Thus, header 410 may include a command code field set to a value of 258 and the R-bit field of the command flags field set, as provided for by the Diameter protocol and 3GPP TS 29.212.

Subscription ID field 430 may be an attribute-value pair (AVP) for indicating a subscription that is associated with the particular request. For example, subscription ID field 430 indicates that the subscription identified by the value "0x5504" is associated with CCR 400. This information may be used to access a subscription profile record and charge the appropriate subscriber in relation to the requested service.

Packet filter information fields 440, 450 may contain service information related to each requested flow for the requested service. In various embodiments, such as those implementing LTE for example, packet filter information fields 440, 450 may be Packet-Filter-Information AVPs. In various embodiments, such as those implementing GPRS for example, packet filter information fields 440, 450 may be TFP-Packet-Filter-Information AVPs. In the example of CCR 400, the request may be, for example, for HTTP server traffic. Packet filter information field 440 may describe a downstream flow, as indicated by the 'out' value, for traffic destined for IP address 120.210.62.160 on port 80 from any source. Likewise, packet filter information field 450 may describe an upstream flow, as indicated by the 'in' value, for traffic sent from IP address 120.210.62.160 on port 80 to any destination. Packet filter information fields 440, 450 may contain additional information such as, for example, a type of service, traffic class, and/or flow label.

QoS information field 460 may contain requested QoS settings for the requested service flows. For example, QoS information field 460 may indicate that the flows requested by CCR 400 should have an allocation retention priority of 3 and a maximum bandwidth of 1 kbps upstream and 64 kbps downstream. QoS information field 460 may contain additional information such as, for example, a QCI, guaranteed bandwidths, and/or a bearer identifier.

In various exemplary embodiments, PCRN 200 may not use QoS information field 460 to determine QoS values when generating a PCC rule. In such embodiments, a PGW such as PGW 134 may include QoS information within the packet filter information fields and PCRN 200 may use this information in the generation of a PCC rule instead.

Additional fields 420, 470 may include additional information as specified by the Diameter protocol and/or 3GPP TS 29.212. Thus, additional fields 420, 470 may include additional attribute value pairs (AVPs) such as the CC-Request-Type AVP, Framed-IP-Address AVP, 3GPP-SGSN-Address AVP, etc. Additional fields 420, 470 may be used in extracting other useful information such as, for example, flow identifying information.

FIG. 5 illustrates an exemplary data arrangement 500 for storing PCC rules. Data arrangement 500 may be, for example, a table in a database stored in rule storage 260. Alternatively, data arrangement 500 could be a series of linked lists, an array, or a similar data structure. Thus, it should be apparent that data arrangement 400 is an abstraction of the underlying data; any data structure suitable for storage of this data may be used.

Data arrangement 500 may include a rule name field 505, service data flow filter field 510, flow status field 515, QoS parameters field 520, charging parameters field 525. Data arrangement 500 may include additional fields (not shown) required or useful in defining a PCC rule such as, for example, a service identifier field, a precedence field, and/or a monitoring key field.

Rule name field 505 may be used to uniquely identify each PCC rule. Service data flow filter field 510 may be used to store a filter for selecting the traffic to which the PCC rule applies. Flow status field 515 may be used to determine whether traffic detected by the associated filter should be forwarded or dropped in the upstream and downstream direction. QoS parameters field 520 may be used to store QoS related information such as the QCI, allocation and retention priority, and authorized bitrates for uplink and downlink. Charging parameters field 525 may be used to indicate a charging key, metering method, whether offline or online charging should be used, and/or how much is to be charged per metered activity unit.

As an example, record 530 indicates that the rule identified by the name "0xE426" is applicable to traffic identified by using the filter "0x90F2CE32 . . . ." Traffic in both directions should be forwarded according to a QCI of 8, allowing 2 kbps upstream and 8 kbps downstream, and the subscriber is to be charged $0.05 per kilobyte transferred.

As another example, record 535 indicates that the rule identified by the name "0x99B2" is applicable to traffic identified by using the filter "0xB2B56FE1 . . . ." Traffic should be forwarded in both directions according to a QCI of 6, allowing 16 kbps upstream and downstream, and the subscriber is to be charged $0.10 per minute of service use. Data arrangement 500 may contain numerous additional PCC rule records 540.

FIG. 6 illustrates an exemplary data arrangement 600 for storing subscription profile data. Data arrangement 600 may be, for example, a table in a database stored in SPR 138. Alternatively, data arrangement 600 could be a series of linked lists, an array, or a similar data structure. Thus, it should be apparent that data arrangement 600 is an abstraction of the underlying data; any data structure suitable for storage of this data may be used.

Data arrangement 600 may include a subscription ID field 605, bandwidth limits field 610, and charging parameters field 615. Subscription ID field 605 may be used to uniquely identify the subscription profile associated with a service data flow. Bandwidth limits field 610 may be used to indicate the maximum bitrates allowed for the associated subscription profile in the upstream and downstream directions. Charging parameters field 615 may be used to indicate the default rates to be used for the associated subscription profile for various application services.

As an example, record 620 indicates that the subscription profile identified by "0x3F53" is limited to 2 kbps upstream and 512 kbps downstream. This subscription profile is to be charged a default rate of $0.02/kb for a first type of service (e.g., Internet access) and a default rate of $0.05/min for a second type of service (e.g. voice communication). As another example, record 625 indicates that the subscription profile identified by "0x5504" is limited to 2 kbps upstream and 1024 kbps downstream. This subscription profile is to be charged a default rate of $0.01/kb for a first type of service and a default rate of $0.05/min for a second type of service. Data arrangement 600 may contain numerous additional PCC rule records 630.

FIG. 6 illustrates an exemplary data arrangement 700 for storing correlations between media types and quality of service (QoS) class identifiers (QCIs). Data arrangement 700 may be, for example, a table in a database stored in policy decision rule modifier 250, rules storage 260, or other element of PCRN 200. Alternatively, data arrangement 700 could be a series of linked lists, an array, or a similar data structure. Thus, it should be apparent that data arrangement 700 is an abstraction of the underlying data; any data structure suitable for storage of this data may be used.

Data arrangement 700 may include a media type field 705 and a QCI field 710. Media type field 705 may be used to indicate a media type enumerated by 3GPP TS 29.214. QCI field 710 may be used to indicate a QCI associated with the media type. As an example, record 715 shows that the AUDIO media type is associated with a QCI of 6. Likewise, records 720, 725, 730, 735, 740, 745, 750 show that the VIDEO, DATA, APPLICATION, CONTROL, TEXT, MESSAGE, and OTHER media types are associated with QCIs of 7, 5, 8, 2, 2, 4, and 1, respectively. These QCIs may be used to further define the default QoS provided for each media type.

Figure 8:
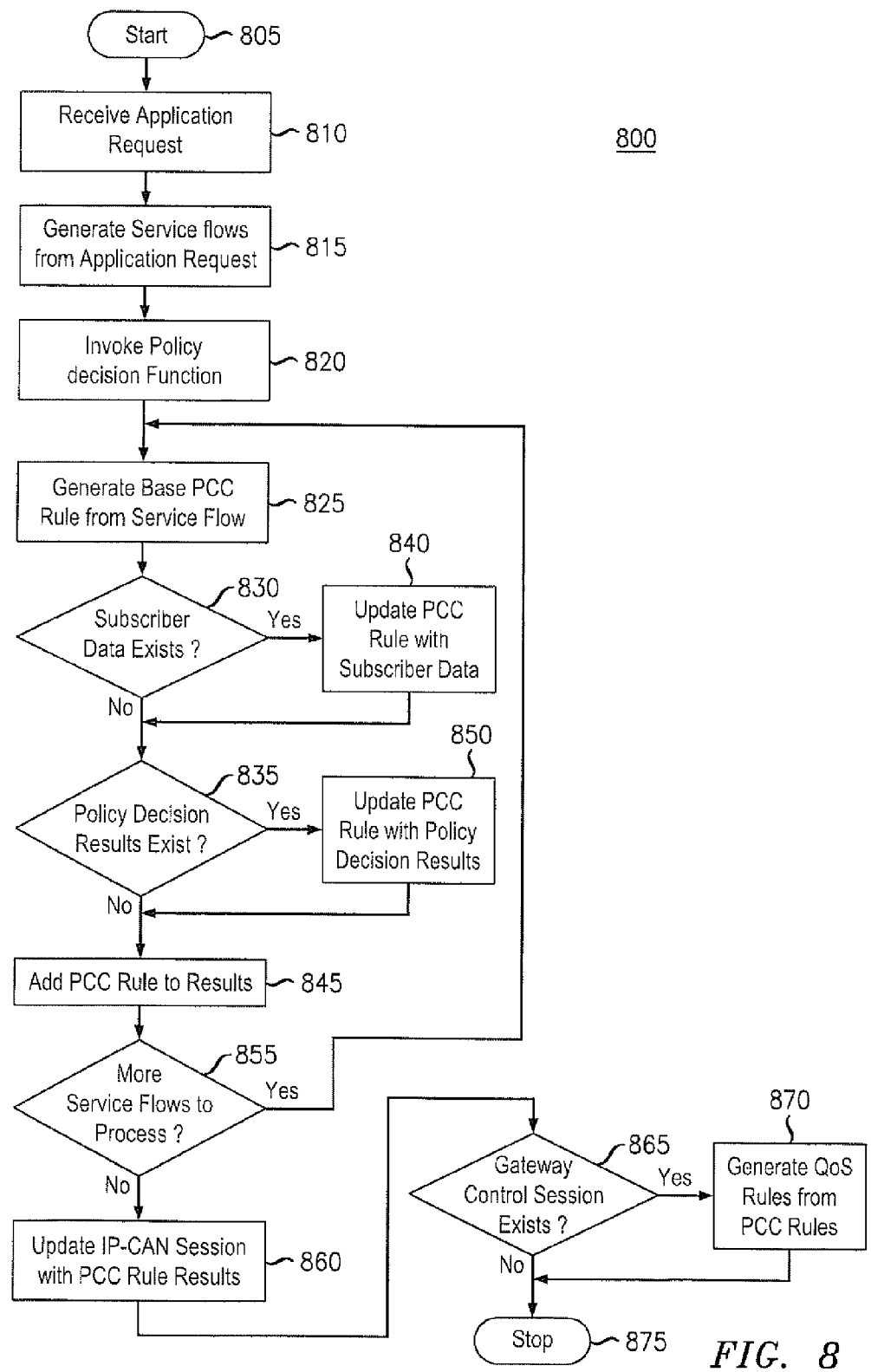
FIG. 8 illustrates an exemplary method for creating new policy and charging control (PCC) rules in response to an application request.

FIG. 8 illustrates an exemplary method 800 for creating new policy and charging control (PCC) rules in response to an application request. Method 800 may be performed by the components of PCRN 130 and/or PCRN 200 to establish PCC rules for service data flows identified by an application request.

Method 800 may begin at step 805 and proceed to step 810 where PCRN 130, 200 may receive an application request in the form of an AAR via the Rx interface 205 and/or a CCR via the Gxx interface 275 or Gx interface 285. At this point, application request translator 210 may determine whether the received message corresponds to another, complimentary message, either previously received or expected to be received. If so, application request translator may generate a full application request according to any manner known to those of skill in the art of processing complimentary application requests. Method 800 may then proceed to step 815 where application request translator 210 may translate the application request into service flow objects. In the case of an AAR, application request translator 210 may extract the media components and media sub-components from the AAR and establish a service flow object for each media subcomponent. In the case of a CCR, application request translator 210 may extract the packet filter information and/or QoS information fields and establish a service flow object for each packet filter information field.

Then, in step 820, policy decision module 240 may invoke a policy decision function to generate various parameters from the application request, existing application sessions, subscription profile data, and/or policy rules. Policy decision module 240 may utilize an externalized rule set in order to determine a set of applicable parameter values based on the context of the request. Method 800 may then proceed to step 825 where base rule generator may generate a base PCC rule from the first service flow object and/or application request. Generation of a base PCC rule may include, for example, generating a PCC rule name, service data flow filter, and initial QoS bandwidth parameters. Then, in step 830, subscriber rule modifier 230 may attempt to retrieve a subscription profile record associated with a subscription ID in the application request via the Sp interface 235. If such a subscription profile record does not exist, then method 800 may proceed to step 835. If a subscription profile record does exist however, method 800 may proceed to step 840 where subscriber rule modifier 230 may update the PCC rule with information from the subscription profile record. This update may include adding appropriate charging parameters to the PCC rule and/or updating the QoS bandwidths in the PCC rule in accordance with the subscriber's bandwidth limits.

In step 835, policy decision modifier may determine whether policy decision module 840 has generated any policy decision results relevant to the current PCC rule in step 820. If no relevant results have been generated, method 700 may proceed to step 845. If, instead, there are relevant policy decision results, method 800 may proceed to step 850 where policy decision rule modifier 250 may update the current PCC rule according to the policy decision results. This update may include adding a service identifier, rating group, metering method, and/or other information to the PCC rule. Policy decision rule modifier 240 may further determine a QCI to associate with the PCC rule from the stated media type, if present.

Method 800 may then proceed to step 845 where the current PCC rule may be added to the current results for the application request. The PCRN may also add the PCC rule to rules storage 260 at this point. Method 800 may then proceed to step 855 where PCRN 200 may determine whether there are any additional service flow objects to be processed into PCC rules. If there are additional service flow objects, method 800 may loop back to step 825. If there are no additional service flow objects, method 800 may proceed to step 860.

At step 860, IP-CAN session manager 280 may update the IP-CAN session by transmitting each new PCC rule in the results to the appropriate PCEN such as PGW 134. At step 865, gateway control session manager 270 may determine whether the SGW 132 or other node implements a gateway control session, such as in a PMIP deployment. If no such gateway control session exists, method 800 may proceed to end in step 875. Otherwise, in step 870, gateway control session manager 270 may generate a set of QoS rules by extracting the QoS portion from each PCC rule in the results and create a new QoS rule from each extracted QoS portion. Gateway control session manager 270 may then transmit the QoS rules to SGW via the Gxx interface and method 800 may end in step 875.

Having described exemplary components and methods for the operation of exemplary subscriber network 100 and PCRN 200, an example of the operation of exemplary network 100 and PCRN 200 will now be provided with reference to FIGS. 1-7. PCRN 136 may correspond to PCRN 200. The contents of rule storage 260 may be indicated by data arrangement 500 and the contents of SPR 138 may be indicated by data arrangement 600. AAR 160 may be described in detail by AAR 300. Note that, while the following example describes the processing of an AAR message, the described methods are also applicable to a CCR message, such as CCRs 170, 400.

The process may begin when PCRN 136, 200 receives AAR 160, 300. Application request translator 210 may then extract media components 340, 350 from the AAR and create four service flow objects corresponding to each media subcomponent 343, 346, 353, 356: SFO1, SFO2, SFO3, and SFO4, respectively. Thus, SFO1 may indicate a video-control flow having 1 kbps bandwidth in both directions; SFO2 may indicate a video-stream flow having 256 kbps bandwidth in the downstream direction; SFO3 may indicate an audio-control flow having 1 kbps bandwidth in both directions; and SFO4 may indicate an audio-stream flow having 128 kbps bandwidth in the downstream direction. Policy decision module 240 may then invoke a policy decision function in step 820.

Base rule generator 220 may then create a base rule for SFO1 in step 825. This base rule may include information such as, for example, a rule name, the requested bandwidths, and service flow parameters. Thus, base rule generator 220 may generate a name for the new PCC rule such as, for example, "0xF30F." Base rule generator 220 may also insert the requested maximum bandwidths of 1 kbps upstream and downstream into the QoS portion of the new PCC rule. Base rule generator 220 may further infer that the flow status of the PCC rule should set the flow status to OPEN in both directions. Base rule generator 220 may also generate a service data flow filter, such as "0xDD3E5323 . . . ," for identifying the traffic to which the new PCC rule will apply. Base rule generator 220 may perform further operations in order to more fully define the new PCC rule. Thus, base rule generator 220 may be a fully functional or partially functional PCC rule.

In steps 830 and 840, subscription rule modifier 230 may retrieve a record associated with subscriber 0x5504 as identified by AAR field 330. Thus, subscription rule modifier 230 may receive subscription profile record 630 via the Sp interface 235. Subscription rule modifier 230 may then modify the new PCC rule according to subscription profile record 630. This step may include verifying that the bandwidth limits for the subscriber are not surpassed by the request. Thus, in the case where subscriber 0x5504 is using no other subscription data flows, the requested flow of 1 kbps bandwidth in both directions will not surpass this user's bandwidth limits of 2 kbps upstream and 1024 kbps downstream, as provided by subscription profile record 630. Subscriber rule modifier 230 may also select appropriate charging parameters from subscription profile record 630. Thus, subscriber rule modifier 230 may determine that the charging rate of $0.01/kb applies to the requested service flow and insert this charging rate into the new PCC rule.

Policy decision modifier 250 may then further modify the new PCC rule based on the results provided by policy decision module 240. This step may include inserting information into the new PCC rule such as, for example, a QCI, rating group, metering method, and service identifier. Policy decision modifier 250 may further modify existing values, such as QoS parameters, based on decision results. Policy decision modifier 250 may also refer to data arrangement 700 to determine a QCI for the PCC rule. Thus, policy decision modifier may refer to map entry 735 to determine that, because SFO1 relates to a CONTROL media type, a QCI of 2 should be included in the new PCC rule.

The same process may then be repeated for SFO2, SFO3, and SFO4. Policy decision modifier 250 may store the new PCC rules in rule storage 260 and IP-CAN session manager 280 may transmit the new PCC rules to PGN 134 via Gx interface 285 for installation. Gateway control session manager 270 may also determine, in step 865, whether there is a relevant gateway control session. If so, gateway control session manager 270 may extract the QoS portion from each new PCC rule to create a set of new QoS rules. Gateway control session manager 270 may then forward the new QoS rules to SGW 132 via Gxx interface 275. Thus, PCRN 136, 200 has received an AAR 160, 300 from AF 150 and generated four PCC rules and QoS rules (if necessary) for providing the requested service.

According to the foregoing, various exemplary embodiments provide for dynamic creation of policy and charging control rules in response to a network-originated or user equipment-originated application request. Particularly, by translating an application request message into a number of requested service flows, a policy and charging rules node may generate a rule to provide each requested service flow that is dynamically based on the requested application, subscriber data, and/or rule-based policy decisions.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method performed by a policy and charging rules node (PCRN) for processing an application request message to generate at least one policy and charging control (PCC) rule, the method comprising:
   receiving, at the PCRN, the application request message;
   determining at least one requested service flow from the application request message;
   for a requested service flow of the at least one requested service flow, generating, by the PCRN, a new PCC rule based on the application request message;
   performing a policy decision to generate a set of policy decision results, the policy decision being based on at least one of: the application request message, an existing application session, and a subscriber record;

modifying, by the PCRN, the new PCC rule based on the set of policy decisions before providing the new PCC rule to a Policy and Charging Enforcement Node (PCEN); and providing the new PCC rule to the PCEN.

2. The method of claim 1, further comprising:
identifying a subscriber from the application request message;
retrieving a subscriber record corresponding to the identified subscriber; and
modifying the new PCC rule based on the subscriber record.

3. The method of claim 1, wherein the application request message includes at least one media component and the step of determining at least one requested service flow from the application request message comprises:
for each media component, determining at least one requested service flow from the media component.

4. The method of claim 3, wherein at least one media component contains at least one media subcomponent and the step of determining at least one requested service flow from the media component comprises:
for each media subcomponent, determining a requested service flow from the media subcomponent.

5. The method of claim 1, wherein the application request message includes at least one packet filter information section and the step of determining at least one requested service flow from the application request message comprises:
for each packet filter information section, determining a requested service flow from the packet filter information section.

6. The method of claim 5, wherein the application request message includes a QoS information section and the step of determining a requested service flow from the packet filter information section comprises:
determining QoS information for the requested service flow from the QoS information section.

7. The method of claim 5, wherein the at least one packet filter information section includes at least one of: a Packet-Filter-Information attribute-value pair (AVP) and a TFT-Packet-Filter-Information AVP.

8. The method of claim 5, wherein the packet filter information section includes QoS information and the step of determining a requested service flow from the packet filter information section comprises:
determining QoS information for the requested service flow from the packet filter information section.

9. The method of claim 1, further comprising, for the new PCC rule:
determining a media type from the application request message;
determining a QoS class identifier (QCI) from the media type;
generating QoS information using the QCI; and
modifying the new PCC rule based on the QoS information.

10. The method of claim 1, further comprising, for the new PCC rule:
extracting a quality of service (QoS) portion from the PCC rule;
generating a new QoS rule from the QoS portion; and
transmitting the new QoS rule to a gateway control node.

11. The method of claim 1, wherein:
performing the policy decision comprises evaluating at least one policy rule from an externalized rule set to determine at least one parameter value to be inserted into the new PCC rule, and modifying the new PCC rule based on the set of policy decision results comprises inserting the at least one parameter value into the new PCC rule.

12. A policy and charging rules node (PCRN) for processing an application request to generate at least one policy and charging control (PCC) rule, the PCRN comprising:
a first interface that receives the application request;
a second interface that transmits policy and charging control rules to a policy and charging enforcement node (PCEN);
an application request translator that translates the application request into at least one requested service flow;
a base rule generator that generates a new PCC rule for a requested service flow of the at least one requested service flow;
a policy decision module that generates a policy decision based on at least one of: the application request, an existing application session, and a subscriber record;
a policy decision rule modifier that modifies the new PCC rule based on the policy decision before providing the new PCC rule to the PCEN; and
an IP-CAN session manager that transmits the new PCC rule to the PCEN via the Gx interface.

13. The PCRN of claim 12, further comprising:
a third interface that communicates with a subscriber profile repository (SPR); and
a subscriber rule modifier that:
determines a subscriber associated with the application request,
retrieves a subscriber record associated with the subscriber from the SPR via the Sp interface, and
modifies at least one new PCC rule based on the subscriber record.

14. The PCRN of claim 12, wherein in translating the application request into at least one requested service flow, the application request translator:
identifies at least one media component contained in the application request; and
for each media component of the at least one media component, translates the media component into at least one requested service flow.

15. The PCRN of claim 14, wherein in translating each media component into at least one requested service flow, the application request translator:
identifies at least one media subcomponent contained in the media component; and
for each media subcomponent of the at least one media subcomponent, translated the media subcomponent into a requested service flow.

16. The PCRN of claim 12, wherein the second interface is the first interface and, in translating the application request into at least one requested service flow, the application request translator determines, for each packet filter information section, a requested service flow from the packet filter information section.

17. The PCRN of claim 16, wherein the application request message includes a QoS information section and, in determining a requested service flow from the packet filter information section, the application request translator determines QoS information for the requested service flow from the QoS information section.

18. The method of claim 16, wherein the at least one packet filter information section includes at least one of: a Packet-Filter-Information attribute-value pair (AVP) and a TFT-Packet-Filter-Information AVP.

19. The method of claim 16, wherein the packet filter information section includes QoS information and in determining a requested service flow from the packet filter information section, the application request translator determines QoS information for the requested service flow from the packet filter information section.

20. The PCRN of claim 12, further comprising:
a fourth interface that transmits quality of service (QoS) rules to a gateway control node; and
a gateway control session manager that, for the new PCC rule:
extracts a QoS portion from the new PCC rule,
creates a new QoS rule based on the QoS portion, and
transmits the QoS rule to the gateway control node via the Gxx interface.

21. The PCRN of claim 12, wherein:
in generating the policy decision, the policy decision module is configured to evaluate at least one policy rule from an externalized rule set to determine at least one parameter value to be inserted into the new PCC rule, and
in modifying the at least one new PCC rule based on policy decision, the policy decision rule modifier is configured to insert the at least one parameter value into the new PCC rule.

22. A non-transitory machine-readable storage medium encoded with instructions for processing an application request message to generate at least one policy and charging control (PCC) rule, the machine-readable storage medium comprising:
instructions for receiving, at the PCRN, the application request message;
instructions for determining at least one requested service flow from the application request message;
instructions for generating, by the PCRN and for a requested service flow of the at least one requested service flow, a new PCC rule based on the application request message;
instructions for performing a policy decision to generate a set of policy decision results, the policy decision being based on at least one of: the application request message, an existing application session, and a subscriber record;
instructions for modifying, by the PCRN and for the requested service flow of the at least one requested service flow, the new PCC rule based on the set of policy decision results before providing the new PCC rule to a Policy and Charging Enforcement Node (PCEN); and
instructions for providing the new PCC rule to the PCEN.

23. The non-transitory machine-readable storage medium of claim 22, further comprising:
instructions for identifying a subscriber from the application request message;
instructions for retrieving a subscriber record corresponding to the identified subscriber; and
instructions for modifying, for the requested service flow of the at least one requested service flow, the new PCC rule based on the subscriber record.

24. The non-transitory machine-readable storage medium of claim 22, wherein the application request message includes at least one media component and the instructions for determining at least one requested service flow from the application request message comprise:
instructions for determining, for each media component, at least one requested service flow from the media component.

25. The non-transitory machine-readable storage medium of claim 24, wherein at least one media component contains at least one media subcomponent and the instructions for determining at least one requested service flow from the media component comprise:
instructions for determining for each media subcomponent, a requested service flow from the media subcomponent.

26. The non-transitory machine-readable storage medium of claim 22, wherein the application request message includes at least one packet filter information section and the instructions for determining at least one requested service flow from the application request message comprise:
instructions for determining, for each packet filter information section, a requested service flow from the packet filter information section.

27. The non-transitory machine-readable storage medium of claim 26, wherein the application request message includes a QoS information section and the instructions for determining a requested service flow from the packet filter information section comprises:
instructions for determining QoS information for the requested service flow from the QoS information section.

28. The non-transitory machine-readable storage medium of claim 26, wherein the at least one packet filter information section includes at least one of: a Packet-Filter-Information attribute-value pair (AVP) and a TFT-Packet-Filter-Information AVP.

29. The non-transitory machine-readable storage medium of claim 26, wherein the packet filter information section includes QoS information and the instructions for determining a requested service flow from the packet filter information section comprise:
instructions for determining QoS information for the requested service flow from the packet filter information section.

30. The non-transitory machine-readable storage medium of claim 22, further comprising:
instructions for determining a media type from the application request message;
instructions for determining a QoS class identifier (QCI) from the media type;
instructions for generating QoS information using the QCI; and
instructions for modifying the new PCC rule based on the QoS information.

31. The non-transitory machine-readable storage medium of claim 22, further comprising:
instructions for extracting a quality of service (QoS) portion from the PCC rule;
instructions for generating a new QoS rule from the QoS portion; and
instructions for transmitting the new QoS rule to a gateway control node.

32. The non-transitory machine-readable storage medium of claim 22, wherein:
the instructions for performing the policy decision comprise instructions for evaluating at least one policy rule from an externalized rule set to determine at least one parameter value to be inserted into the new PCC rule, and
the instructions for modifying the new PCC rule based on the set of policy decision results comprise instructions for inserting the at least one parameter value into the new PCC rule.

* * * * *